US009495182B2

United States Patent
Liu et al.

(10) Patent No.: US 9,495,182 B2
(45) Date of Patent: Nov. 15, 2016

(54) APPARATUS OF RECONFIGURABLE SOFTWARE MODE MANAGEMENT USING RUNTIME EXECUTION ENGINE

(71) Applicant: GM GLOBAL TECHNOLOGY OPERATIONS LLC, Detroit, MI (US)

(72) Inventors: Chang Liu, Ann Arbor, MI (US); Shige Wang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 14/612,547

(22) Filed: Feb. 3, 2015

(65) Prior Publication Data

US 2016/0224356 A1  Aug. 4, 2016

(51) Int. Cl.
*G06F 9/44* (2006.01)
*G06F 9/455* (2006.01)

(52) U.S. Cl.
CPC .............. *G06F 9/45516* (2013.01); *G06F 8/71* (2013.01)

(58) Field of Classification Search
CPC .............................. G06F 9/45516; G06F 8/71
USPC ......................................................... 717/121
See application file for complete search history.

(56) References Cited

U.S. PATENT DOCUMENTS

| | | | | |
|---|---|---|---|---|
| 5,080,447 A * | 1/1992 | Leppek | .................... | B60T 8/173 303/162 |
| 5,281,009 A * | 1/1994 | Kidston | ................ | B60T 8/4266 303/156 |
| 6,479,908 B1 * | 11/2002 | Utter | ....................... | B60R 25/04 307/10.3 |
| 7,004,156 B2 * | 2/2006 | Lee | ..................... | F02D 41/0002 123/295 |
| 7,082,925 B2 * | 8/2006 | Katrak | .................. | F02D 41/222 123/396 |
| 8,170,750 B2 * | 5/2012 | Katrak | ................... | B62D 5/008 180/422 |
| 2004/0203691 A1 * | 10/2004 | Mazzara | ............. | H04M 1/6083 455/419 |
| 2008/0282195 A1 * | 11/2008 | Nakagawa | .......... | G06F 17/3028 715/838 |
| 2009/0158213 A1 * | 6/2009 | Ryu | .................... | H04M 1/7258 715/825 |
| 2009/0272363 A1 * | 11/2009 | Yun | ........................... | F02B 1/12 123/295 |
| 2009/0281694 A1 * | 11/2009 | Conlon | .................. | B60K 6/445 701/51 |
| 2011/0307570 A1 * | 12/2011 | Speks | ............... | G06F 15/17343 709/208 |
| 2012/0122622 A1 * | 5/2012 | Turnbull | .................. | B60K 6/48 475/5 |
| 2012/0188068 A1 * | 7/2012 | Hanna | ................... | B60W 50/14 340/441 |
| 2013/0332015 A1 * | 12/2013 | Dextreit | ................. | B60K 6/448 701/22 |
| 2014/0121944 A1 * | 5/2014 | Douglas | ................ | F02D 41/064 701/103 |
| 2014/0358262 A1 * | 12/2014 | Yerrace | ................... | G06F 3/165 700/94 |
| 2015/0031347 A1 * | 1/2015 | Kim | .................... | H04M 1/0245 455/418 |
| 2015/0147192 A1 * | 5/2015 | Pryor | .................... | F04B 53/001 417/53 |

\* cited by examiner

*Primary Examiner* — Jason Mitchell
*Assistant Examiner* — Theodore Hebert

(57) ABSTRACT

A method and architecture of reconfiguring software mode management for a system. A prior status mode of a subsystem is identified. The primary controller includes a primary software algorithm for maintaining operations of the subsystem. A mode determination logic function is retrieved in a table for determining whether a mode change occurred. The mode determination logic function associated with the prior mode is executed. A current mode is determined from the table based on results from the execution of the mode determination logic function. An action list associated with the identified current mode in the table is identified. The action list identifies functions for transitioning the nodes from the prior mode to the current node. An action list associated with the current mode including a list of action functions for transitioning the previous mode to the current mode is executed. The table is independently modifiable from the primary software mode management algorithm.

17 Claims, 3 Drawing Sheets

APPARATUS OF RECONFIGURABLE SOFTWARE MODE MANAGEMENT USING RUNTIME EXECUTION ENGINE

BACKGROUND OF INVENTION

An embodiment relates to reconfigurable software-mode management.

Various systems such as an automobiles, airplanes, and other systems utilize controllers for monitoring and controlling operations of their systems. Given current operating conditions or changes in the operating conditions, various controllers in these systems execute software algorithms to adjust vehicle operating parameters.

In many instances, ongoing modifications to software algorithms are made to correct or improve or alter the system's operation. The changes include not only modifications that relate to direct control of the system that the controller is governing, but changes to retrieving data or status of other subsystems whose data is used by a primary controller. These changes are expressed as software modes and are managed by the software mode management algorithm whose functionality is to arbitrate mode change requests from different sources, determine the final mode and perform actions based on the arbitration and determination results. However, modifications to the software mode management algorithm often require scanning the entire software code to identify the places affected by the mode management, creating a significant portion of new software code and replacing the entire code with new code, even if the functional content of the software mode management change is trivial to the primary software code of the controller. This is often time consuming and expensive to make changes to the primary software code since the entire code must be scanned and replaced even if a small change, such as changing a parameter, is made.

SUMMARY OF INVENTION

An advantage of an embodiment is that a flexible and decoupled implementation of software mode management (SMM) system that manages transitions of system for verifying when a mode change occurs and transitioning the system to the current mode such that parameters and other factors are set according to the current mode. A table separate from the primary software algorithm of a controller identifies relationships between a previous mode state and a current mode state that includes a mode determination logic function that sets forth the logic and parameters for determining whether a mode change occurs. Furthermore, the table is reconfigurable such that logic functions as well as values set forth in the table can be easily modified without having to modify the primary software algorithm of the primary controller. This allows the modifications to be made without having to revise and upload the entire software algorithm within the primary controller.

Moreover, the table sets forth what parameters are required for determining whether a status change has occurred. The table may identify parameters from secondary controllers where the primary controller is only required to call on the secondary controller for obtaining the required information. This alleviates the primary controller from having to include algorithms that perform the functions of the secondary controller in obtaining such data.

An embodiment contemplates a method of reconfiguring software mode management for a system. Identifying, by a primary controller, a prior status mode of a subsystem. The primary controller including a primary software algorithm for controlling operations of the subsystem. Obtaining, by a runtime execution engine, a table identifying parameters for identifying a prior mode and determining a current of the subsystem. Retrieving, by the runtime execution engine, a mode determination logic function in a table for determining whether a mode change occurred. Executing, by the runtime execution engine, the mode determination logic function associated with the prior mode. Determining, by the runtime execution engine, a current mode from the table based on results from the execution of the mode determination logic function. Identifying, by the runtime execution engine, an action list associated with the identified current mode in the table, the action list identifying functions for transitioning from the prior mode to the current node. Executing, by the runtime execution engine, an action list associated with the current mode including a list of action functions for transitioning the previous mode to the current mode, wherein the table is independently modifiable from the primary software algorithm.

DETAILED DESCRIPTION

Figure 1:
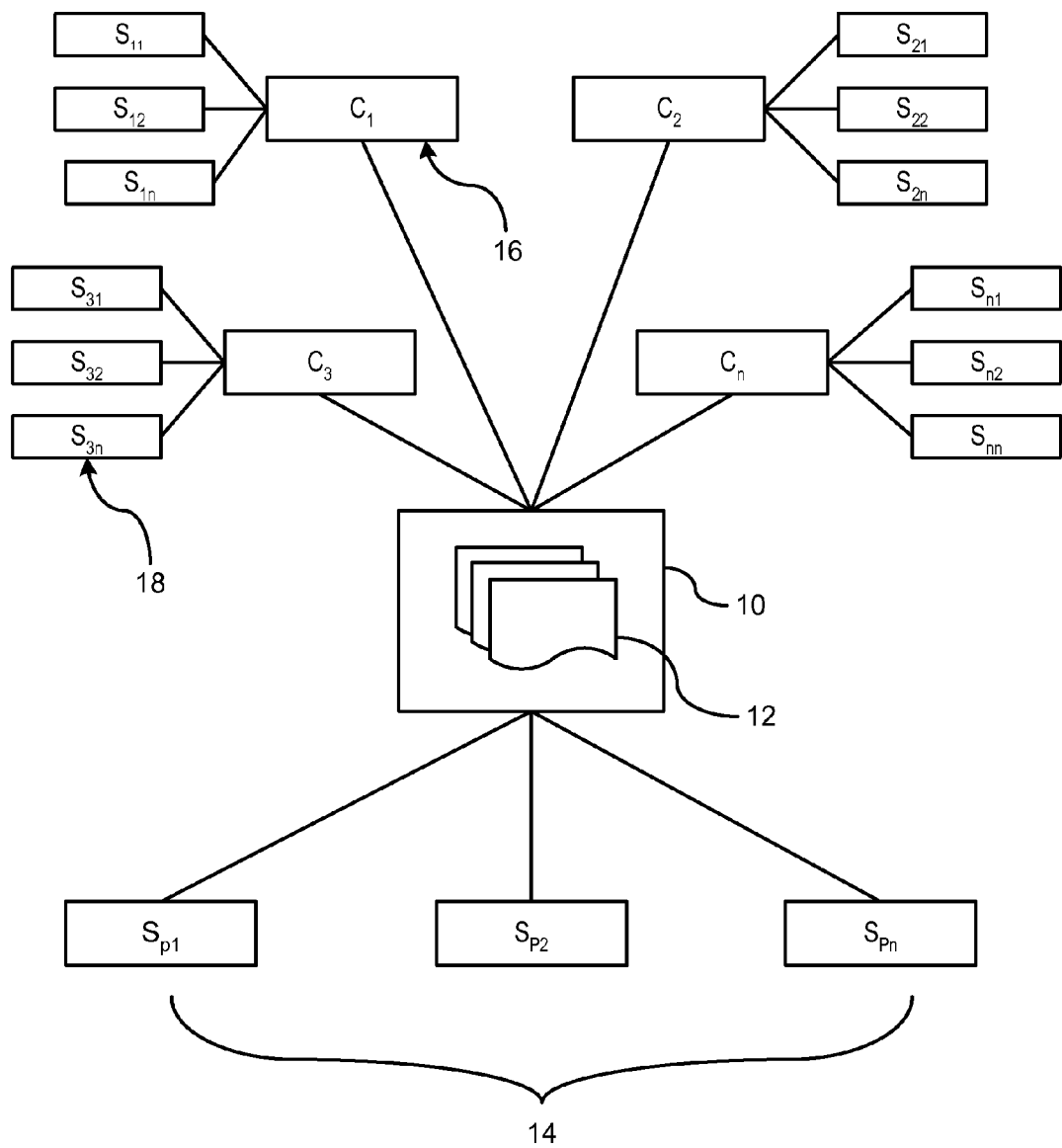
FIG. 1 illustrates a configuration of an exemplary architecture of controllers used in a system.

FIG. 1 illustrates a configuration of an exemplary architecture of controllers used in a system. In the embodiment illustrated herein, a primary controller 10, (e.g., a powertrain control module (PCM)), functions to control primary operations of a vehicle subsystem (e.g., powertrain system). The primary controller 10 includes at least one software algorithm 12 which monitor and control a plurality of functions and factors of a primary subsystem. The primary controller 10 obtains data directly from a plurality of primary sensors 14 (e.g., $S_{p1}$, $S_{p2}$, ... $S_{pn}$) within the powertrain system. It should be understood that while the exemplary primary system described in this example is a vehicle-based system, it should be understood that the invention described herein can also apply to non-vehicle systems that include, but are not limited to, airplanes, boats, or any other non-automotive application where multiple controllers are utilized.

The primary controller 10 communicates with a plurality of secondary controllers 16 (e.g. $C_1$, $C_2$, $C_3$, ... $C_n$) for obtaining data required to maintain and execute primary operations. The secondary controllers 16 communicate with a plurality of secondary sensors 18 (e.g., $S_{11}$, $S_{22}$, $S_{33}$ ... $S_{mn}$) that provide data to the secondary controllers 16 relating to operations that are auxiliary to the primary operations of the primary subsystem. The plurality of secondary controllers 16 are controllers that monitor and control functions/operations of subsystems other than the powertrain operations. Data obtained by the secondary controllers relating to the other subsystems may be utilized by the primary controller 10 for various purposes. For example, the powertrain module may use data from a body control module for determining the status or a change in status which affects the current operations of the powertrain system. It should be understood that the primary controller as described herein can be any controller within the system that utilizes software algorithms for controlling its own subsystem, and the secondary controllers are any controllers outside of the primary subsystem for which the primary controller is in communication with for obtaining data that may be used by the primary controller for making decisions of how to the control its primary operations or provide signals to secondary controllers to activate/deactivate a respective function. The controllers communicate with one another for sharing data so that a determination of whether an action or non-action is required by the primary controller.

In regards to software mode management and examples described herein, software mode in general is associated with a software variable which is used to represent the mode (i.e. the status or state) of a subsystem at run time. For example, in the above PCM controller, the engine speed is detected and reported by a sensor and the vehicle wheel speed is reported by a secondary controller. The engine speed can be classified into three mode values: high, medium and low. Specific RPM threshold values and logical conditions need to be given to determine the current engine speed mode. When engine speed mode changes or remains in the same value, certain control actions need to be performed. Similar actions apply to the wheel speed mode. Furthermore, the combination of the engine speed mode and wheel speed mode can produce a corresponding transmission gear mode, which again will trigger the control actions due to the mode transition or no-transition. Another example is the vehicle power mode, which is in general determined by the ignition key position such as off, accessory, crank and run. The power mode is used to trigger various control actions that include, but are not limited to as waking up the control modules, enabling the communication buses, limit the power usage of the accessory.

Each of the controllers includes one or more software algorithms that are executed for controlling a respective operation. Enablement or disablement of respective functions is based on changes in vehicle operating parameters which are constantly monitored by the primary and secondary controllers. However, in many instances changes must be made to the software code as a result of various reasons that include, but are not limited to, improvements or new addition of the functionalities, improvements of the operation efficiency, requirements to meet new regulations, errors in the code, calibration changes, changes to operating parameters. For example, in order to meet a respective emission standard, the engine speed mode may need to be defined in a more accurate manner, which requires more than three (high, medium, low) mode values. The corresponding mode determination logical conditions will need to be updated accordingly. As a consequence, the control actions triggered by the mode transitions or no-transitions also need to be adapted. These modifications require locating the respective subroutine in the algorithm and making revisions accordingly to the code, and then uploading and replacing the entire software code. Often times, such changes may be costly and time consuming to revise, since the entire software needs to be scanned for identifying the affected functions, which often dispersed in various software modules, and after a change is made, the entire software code must be re-uploaded to the controller.

To accommodate changes to the software code without requiring extensive modifications to the software code, a reconfigurable Software Mode Management (SMM) system is utilized as described herein. The SMM system is responsible for determining the status modes of the vehicle, identifying the current modes of the subsystems, determining whether any mode changes have occurred, and performing actions required based on the identified modes. The main components of the SMM as described herein include (1) a mode definition component; (2) a mode determination component; and (3) an action list component.

The mode definition component is a set of enumerative and mutually exclusive values. The values may be defined as a single value or a combination of values. These values are predetermined during a design stage. The values can include, but are not limited to, parameter values, state values that identify the operating conditions, operating range values that define the current state of the mode, and what the current state of the mode should be based on the operating conditions. The mode definition is stored as a software mode variable with a given set of possible mode values. The mode definition can be represented by the following expression:

SWModeVariablee[Mode1, Mode2, Mode3, . . . ModeN]

The mode determination component defines a logic condition/function for determining the mode, and more specifically, whether a mode change has occurred. The parameters for logic condition/function are set at design time and stored in a table which will be discussed in detail later. The software mode variable will assume one of the possible modes based on the logic condition/function. A determination is made at runtime based on the logic function defined for a respective mode. Two exemplary determination representations may be utilized. The first determination represents a static condition and the second determination represents a variable condition. The first exemplary determination illustrates the static condition where the mode does not change. The conditions are based on exclusive values, and therefore, if the parameters that define the mode are within the exclusive value, then the current mode will stay the same as the previous mode. An example of the logic condition remaining unchanged is as follows:

If (var1>k1)&& (Var2<k2)&& (var3!=k3) Then
    SWModeVar=Mode2

The second exemplary determination represents a variable logic condition. Under the variable logic condition, the logic condition check is based on the current mode value itself. The variable may be single variable or may be a combination variable. As a result, the respective conditions need to be identified in order to determine whether the mode transitioned to another mode. This may include obtaining data from another subsystem in order to check the logic condition. An example of the variable condition is whether the vehicle speed is greater than 20 mph and also based on whether distance to a lead vehicle is greater than a respective distance. An example of a logic condition/function being dependent on a current mode is represented as follows:

if (SWModeVar==Mode2) if (var4>k4) &&
    (var5<k5) && (var6!=k6) then
    SWModeVar=Mode3

A mode determination rate is utilized for each mode for and the rate at which the mode variable is calculated and updated at runtime. The mode determination rate is predefined and set at design time. For example, a check may be performed at various time intervals (e.g., 10 msec, 1 sec, or 5 sec). Each respective software subsystem may have a respective determination rate which its mode is analyzed for determining whether a mode change has occurred.

In the action list execution mode, an action list is a sequence of actions triggered by the software mode or mode change. Two triggering mechanisms that are considered are (1) triggering by change, and (2) triggering by value.

Under triggering by change, an action list is executed if a mode transition is detected. An example of triggering by change is as follows:

If ((SWModeVar[previous])==Mode1) && (SW-
ModeVar[now]==Mode2) then perform action
list A1.

Under triggering by value, the action list is executed periodically as long as the SWModeVar assumes a certain mode value. The execution rate is equal to the mode determination rate. An example of triggering by value is as follows:

If (SWModeVar==Mode1), then periodically executing an action list A2.

While components of the SSM system provide the guidelines for defining modes, determining the modes, and executing an action list triggered by the mode value or mode change, parameters or conditions within which provide the boundaries or logic expressions for determining the mode are often revised for enhancing operations of a subsystem. To assist with modifications to the code, a mode information table is constructed which identifies the parameters utilized by the three components for determining the mode. An exemplary table is as follows. In this table, we assume a mode variable having three possible mode values: M1, M2 and M3.

| Prev Mode | Mode Deter Function | Current Mode | Action List |
|---|---|---|---|
| M1 | ModeType Func1( ) | M1 | List of Functions (trigger by value) |
|  |  | M2 | List of Functions (trigger by change) |
|  |  | M3 | List of Functions (trigger by change) |
| M2 | ModeType Func2( ) | M1 | List of Functions (trigger by change) |
|  |  | M2 | List of Functions (trigger by value) |
|  |  | M3 | List of Functions (trigger by change) |
| M3 | ModeType Func3( ) | M1 | List of Functions (trigger by change) |
|  |  | M2 | List of Functions (trigger by change) |
|  |  | M3 | List of Functions (trigger by value) |

As shown in the table, the first column represents a previous mode which indicates the prior mode status. This is used to identify whether a current mode stayed the same or was changed.

The second column represents a mode determination function that includes a function logic statement for each respective mode that identifies the mode type and the associated logic for determining whether conditions exist for executing a mode change.

The third column represents the current mode which indicates whether a transition between modes occurred. For example, for previous mode M1, either no transition may occur where the current mode remains in mode M1, or a transition may have occurred where the current mode could be mode M2 or Mode M3. It should be understood that modes identified in the table are exemplary and that more or less modes as illustrated in the table may be utilized.

The fourth column represents an action list for each possible resulting current mode. The action list identifies the action for enabling the transition that may be triggered by a mode value or a mode change. If the previous mode and the current mode remain the same, then the action list is triggered by a mode value. If the previous mode and the current mode are different, then the action list is triggered by a mode change. As a result, the table identifies potential transitions, along with the function as to how to determine whether a mode change has occurred or not.

To avoid having to change the software code per se, parameters, conditions, and a status as represented by values may be stored in a table where the primary algorithm utilizes the table and the parameters therein for identifying whether a transition mode occurred and performs the necessary control actions. This algorithm is described as a Runtime Mode Management Execution Engine (hereinafter referred to as runtime execution engine) in this embodiment. As a result, a table can be constructed and revised with the appropriate values and parameters without having to change the actual software code. The software code will reference the table, which the table sets forth conditions and values needed for identifying whether a mode change occurred. As a result, if the software code needs updating, a parameter or logic function, only the table needs to be modified. As a result, the software algorithm stored in the primary controller does not need to be modified, and more importantly, the entire software algorithm does not need to be revised and uploaded to the controller. Tables may be modified including parameters used to identify transitions as well as the logic functions. In addition, modes may be added, deleted, or revised easily by just modifying only the table and its contents.

Figure 2:
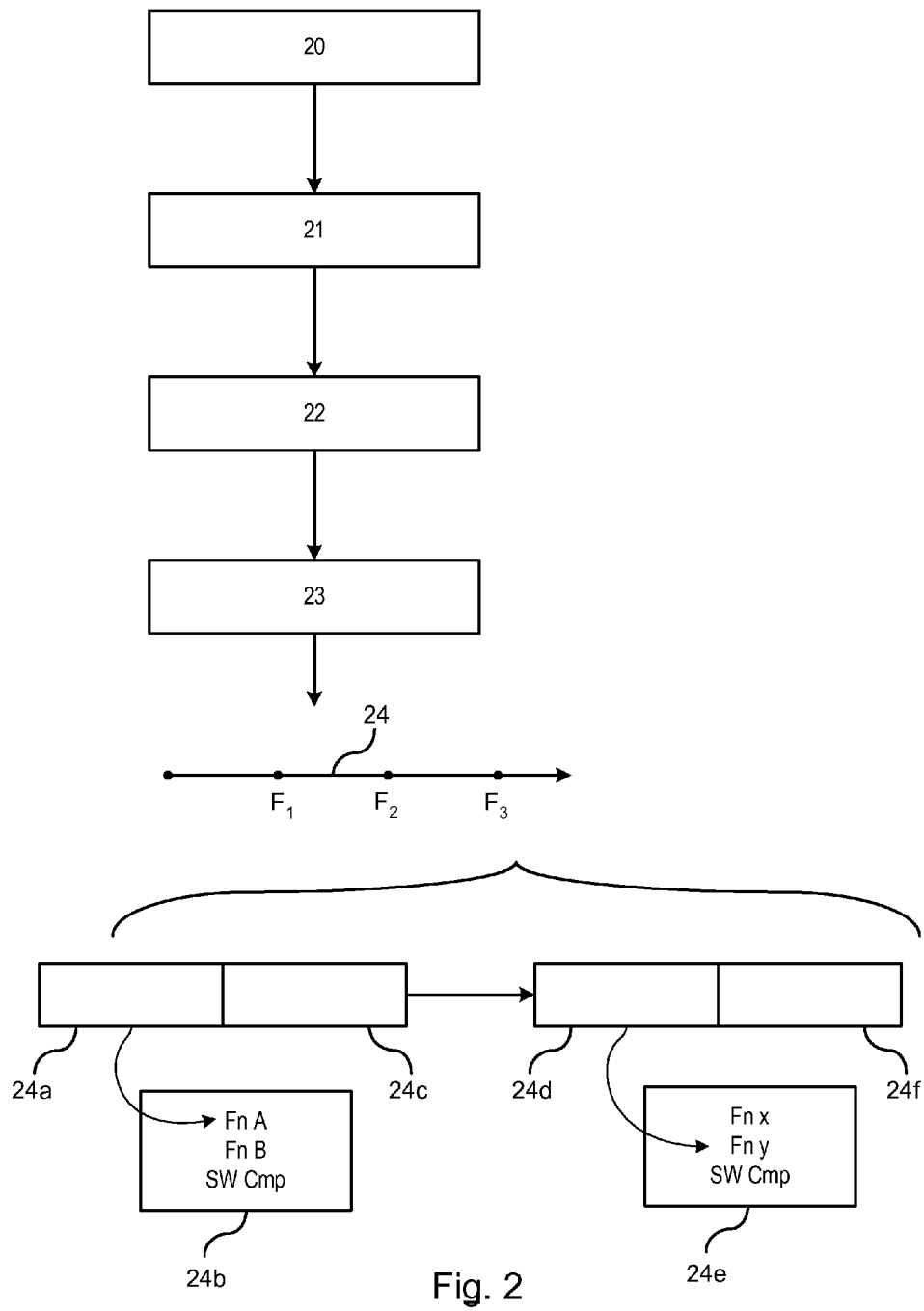
FIG. 2 is a block diagram of a runtime execution engine.

In addition to the table, the runtime execution engine is utilized. The runtime execution engine parses the table information and performs the software mode management. The runtime execution engine is represented by the block diagram in FIG. 2. It is understood that the mode management algorithm change will only affect the mode configuration table. The runtime execution engine is independent from the mode management algorithm and therefore, it doesn't require any further software update.

In block 20, a table entry is found for the previous mode. This is identified as the previous mode in the table.

In block 21, the mode determination function is executed. This includes the logic function used to determine whether the operating conditions indicate that the mode stayed the same or whether a change mode is required. The logic function may utilize portions of software algorithms from other secondary controllers. For example, a primary controller such as a PCM may call on the body control module (BCM) or cruise control module (CCM) to determine a status of a certain operating condition that is required for whether the primary controller requires a transition to another mode. As described, the table sets for the logic function which may include data input from other controllers. As a result, instead of the primary controller including software that includes the logic functions and the respective parameters within main software algorithm, the primary controller references the table, which sets forth the logic function and respective parameters utilized to make such determinations. The table may be readily modifiable without having to alter the software algorithm of the primary controller.

In block 22, a sub-table entry is identified for the current mode.

In block 23, the associated action list is executed that includes the list of action functions. The action list will identify a list of action functions (e.g., $F_1$, $F_2$, and $F_3$) as shown in block 24. This is defined at design time. The action list provides a set of functions that provides a structure or map that guides the routine from one node to a next node. This provides a universal data structure for consistent implementation across multiple SSM requirements. Each node on the action list is an instance of a software structure defined as represented in greater detail in blocks 24a-f. This structure defines a pointer of Action Function associated with this node and a pointer to the next node of the same structure. For example, in block 24 during the execution, the runtime execution engine obtains the action list from the table. The action list will identify a first ActionFunctionPointer 24a that points to a respective function to execute. In this example, the first ActionFunctionPointer 24a points a first function 24b to execute a respective function of the first software component (e.g., Fn A). Upon completion of the first function 24b, the runtime execution engine will follow a NextFunctionPointer 24c to a next node. The next node will contain a next ActionFunctionPointer 24d, the runtime execution engine points to a next function 24e for executing a respective function of the second software component (e.g., Fn y). Recall that the first software component may be a different software component from the first software component. Upon completion of the second function, the process with continue with a NextFunctionPointer 24f and execute associated functions until the NextFunctionPointer points to nothing.

Figure 3:
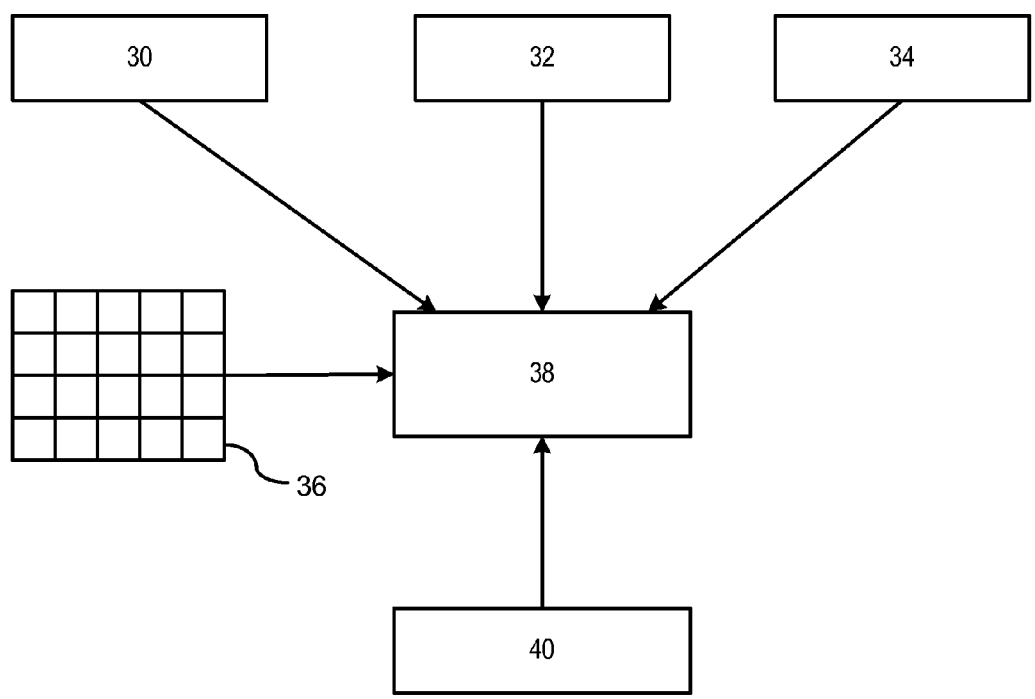
FIG. 3 illustrates a block diagram utilizing the software management system.

FIG. 3 illustrates a block diagram utilizing the system components described herein. Block 30 represents a first functional software component, block 32 represents a second functional software component, and block 34 represents an nth functional software component. Each of the respective functional software components may reside on different controllers throughout the vehicle.

Block 36 illustrates the mode management table as described earlier. The mode management table 36 is stored separately outside of the SMM system.

Block 38 represents a runtime execution engine. The runtime execution obtains variables from each of the respective controllers for mode determination. The runtime execution engine 38 also downloads the mode management table 36.

The runtime execution engine 38 is in communication with the operating system/infrastructure service 40. An invocation of the runtime execution engine 38 is triggered in response to communications from the operation system/infrastructure service 40. When triggered, the runtime execution engine 38 collects variables from the components, subsystems, secondary controllers, and in cooperation with the downloaded mode management table 36, determines and performs an appropriate action set forth in the tables based on the collected variables and data.

The above technique allows for support of multiple software subsystem modes within the system. Each software subsystem mode (e.g., engine speed mode, cruise control mode, key-on/key-off mode) will have a respective execution engine that is operated at a respective determination rate for checking its respective subsystem for identifying whether any changes have occurred with the subsystem that requires updating and action on behalf of a respective controller.

While certain embodiments of the present invention have been described in detail, those familiar with the art to which this invention relates will recognize various alternative designs and embodiments for practicing the invention as defined by the following claims.

What is claimed is:

1. A method of reconfiguring software mode management for a system comprising the steps of:
    identifying, by a primary controller, a prior status mode of a subsystem, the primary controller including a primary software algorithm for controlling operations of the subsystem;
    obtaining, by a runtime execution engine, a table identifying parameters for identifying a prior mode and determining a current mode of the subsystem;
    retrieving, by the runtime execution engine, a mode determination logic function in the table for determining whether a mode change occurred;
    executing, by the runtime execution engine, the mode determination logic function associated with the prior mode;
    determining, by the runtime execution engine, a current mode from the table based on results from the execution of the mode determination logic function;
    identifying, by the runtime execution engine, an action list associated with the identified current mode in the table, the action list identifying functions for transitioning from the prior mode to the current mode;
    executing, by the runtime execution engine, an action list associated with the current mode including a list of action functions for transitioning the previous mode to the current mode;
    wherein the table is independently modifiable from the primary software algorithm.

2. The method of claim 1 wherein the table includes a mode determination logic function for determining the current mode.

3. The method of claim 1 wherein the table includes mode values, wherein the mode values represent possible states that an application component operates in.

4. The method of claim 1 wherein the table includes transition mode values, the transition mode values represent a next mode that an application component can transition to.

5. The method of claim 1 wherein the table is stored in a location other than the runtime execution engine.

6. The method of claim 1 wherein the table includes a list of action functions including a set of functions that provides a structure that guides the transition from the previous mode to the current mode, the set of functions setting forth discrete nodes that operate as steps in guiding the transition to the current mode.

7. The method of claim 6 further comprising the step of generating a return code that indicates a successful completion of the current action function.

8. The method of claim 7 wherein the primary controller terminates execution of the action list in response to an error return code by the current action function or if a pointer pointing to the next node is empty.

9. The method of claim 1 wherein a mode variable is analyzed periodically at a respective mode determination rate, wherein the mode determination rate is predetermined.

10. The method of claim 1 wherein a respective mode determination rate is specifically designed for a respective mode.

11. The method of claim 1 further comprising the steps of parsing table information and performing software mode management by the runtime execution engine.

12. The method of claim 1 wherein the table is reconfigurable for modifying a logic determination function.

13. The method of claim 1 wherein the action list is structured for mapping a sequence of nodes to transition to for executing functions within each identified node.

14. The method of claim 13 wherein the action list is structured for sequentially identifying functions to execute, wherein the structure includes an action pointer function utilized by the runtime execution engine for identifying a respective function for execution within a current node.

15. The method of claim 1 wherein the action list includes a next function pointer for identifying a next node to transition to in response to a completing the execution of the respective function of the current node.

16. The method of claim 1 wherein the table is reconfigurable for modifying the action list.

17. The method of claim 1 wherein the table is modifiable for adjusting a number of modes that a previous mode may transition to.

\* \* \* \* \*